United States Patent
Gao et al.

[11] Patent Number: 5,945,922
[45] Date of Patent: Aug. 31, 1999

[54] WIDESENSE NONBLOCKING SWITCHING NETWORKS

[75] Inventors: Biao Gao, St. Paul, Minn.; Frank Kwangming Hwang, Warren, N.J.

[73] Assignee: Lucent Technologies Inc., Murray Hill, N.J.

[21] Appl. No.: 08/711,697

[22] Filed: Sep. 6, 1996

[51] Int. Cl.$^6$ .................................................. H04L 12/50
[52] U.S. Cl. ...................... 340/825.8; 340/827; 370/388; 379/271
[58] Field of Search .................. 340/825.8, 826, 340/825.03, 827, 825.02, 825.79; 370/388, 358, 357; 379/220, 271, 292, 306

[56] References Cited

U.S. PATENT DOCUMENTS

| | | | |
|---|---|---|---|
| 4,696,000 | 9/1987 | Payne, III | 370/388 X |
| 4,914,429 | 4/1990 | Upp | 340/825.8 |
| 5,179,551 | 1/1993 | Turner | 370/388 X |
| 5,450,074 | 9/1995 | Yoshifuji | 340/825.8 |
| 5,451,936 | 9/1995 | Yang et al. | 340/825.03 X |
| 5,469,154 | 11/1995 | Karp | 340/825.8 |
| 5,801,641 | 9/1998 | Yang et al. | 340/826 |

OTHER PUBLICATIONS

V.E. Benes, "Mathematical Theory of Connecting Networks and Telephone traffic" (Academic Press, 1965), No month.
Melen and Turner, "Nonblocking multirate networks," SIAM J. Comput., 18 (1989), pp. 301–313, Apr.
Chung and Ross, "On nonblocking multirate interconnection networks," SIAM J. Comput. 20 (1991) pp. 726–736, Aug.
Niestegge, "Nonblocking multirate switching networks," Traffic Eng. for ISDN Desig. and Plan., M. Bonatti and M. Decina (Eds.), Elsevier, 1988, No month.

Primary Examiner—Michael Horabik
Assistant Examiner—William H. Wilson, Jr.

[57] ABSTRACT

A multirate network is Wide Sense Non Blocking with a new routing algorithm classifying requests into large, load greater than $1/(1+p)$, and small groups, where B is the upper load bound of any given request and $p=\lfloor 1/B \rfloor$. Where B is less than $31/32-\beta/4$, substantially $2\beta n(P+1)(B+p-1)/p2$ center interconnection units are restricted for carrying large requests only. For all other B, substantially $2\beta n$ center interconnection units are restricted. Using this routing algorithm, general multirate WSNB is guaranteed with substantially the lesser of $2f(p)+1+3.75\beta n$ and $2n\beta(P+1)(Bp+B+p-1)/p^2$ interconnection units where n is the number of inlets per input stage switch, $\beta$ is the ratio of load capacity of external links to the input and output stages, and the load capacity of the internal links connecting the center stage to the input and output stages. Where the network is a three-rate network then the center stage can be further reduced to 5n center interconnection units for $\beta=1$. The center stage can be even further reduced to 3n center interconnection units if the network is a two-rate network for $\beta=1$.

24 Claims, 3 Drawing Sheets

WIDESENSE NONBLOCKING SWITCHING NETWORKS

FIELD OF THE INVENTION

The present invention relates generally to switching networks. In particular the invention relates to the number of center interconnection units necessary to provide wide-sense nonblocking switching.

BACKGROUND OF THE INVENTION

The three stage Clos network is generally considered the most basic multistage interconnection network (MIN), and is often extendible to MINs with more than three stages. In a symmetric three-stage network, the first/input stage and the last/output stage have r, n×m switches such as crossbar switches. The center stage has m, r×r switches. n inlets and r outlets on each input and output switch respectively, are the inputs and outputs of the network. The input and output stage switches are each linked to every center stage switch. A separate link exists between every center switch and every input switch and between every center switch and every output switch. The inlets and outlets are referred to as external links and the links connecting to the center stage are internal links.

In classical circuit switching, three types of nonblocking properties have been extensively studied. V. E. Benes, "Mathematical Theory of Connecting Networks and Telephone traffic" (Academic Press, 1965), hereby incorporated by reference as if fully set forth herein. A request, which can be any communication type, e.g., a telephone call and data communications, between an inlet and an outlet is routable if there exists a path of links connecting them such that no link on the path is used by any other connection paths. A network is strictly nonblocking if regardless of the routing of existing connections in the network, a new request is always routable. A network is wide-sense nonblocking ("WSNB") if a new request is always routable as long as all previous requests were routed according to a given routing algorithm. A network is rearrangeably nonblocking, or simply rearrangeable, if a new request is always routable given that existing connections can be rerouted. Strictly nonblocking implies WSNB which implies rearrange able.

Every request has an associated weight, or load w which can be thought of as the bandwidth requirement of that request. As each link has a load capacity $\beta$, only a finite number of requests, denoted by the variable set (u,v,w) where u is an inlet, v an outlet and w a load, can be linked to a particular interconnection unit. The loads of all requests to be routed by a network can be normalized such that w has a value between zero and one with each internal link having a capacity of one. Accordingly, each internal link can carry multiple requests as long as the sum of loads of these requests does not exceed a value of one. Furthermore a request can only be routed from inlet u to outlet v if the sum of loads of all requests from inlet u to any outlet other than v does not exceed $\beta-w$, and the sum of loads of all requests from all inlets other than u to outlet v does not exceed $\beta-w$. This is equivalent to setting the load capacity of an external link to be $\beta$.

For the remainder of this application, $\lfloor x \rfloor$ denotes the largest integer not exceeding x, and $\lceil x \rceil$ denotes the smallest integer not less than x. With respect to strictly nonblocking multirate three-stage Clos networks, where B denotes the maximum load of a request, and b the minimum load, it has been shown that a network denoted by C (n,m,r), carrying requests having a load between b and 1, is strictly nonblocking where the number of center stage interconnection units is at least $2\lfloor n-1/b \rfloor +3$. Melen and Turner, "Nonblocking multirate networks," SIAM J. Comput., 18 (1989), pp. 301–313, hereby incorporated by reference as if fully set forth herein. For $\beta=1$, this result was later reduced to $2(n-1)\lfloor 1/b \rfloor +1$. Chung and Ross, "On nonblocking multirate interconnection networks," SIAM J. Comput. 20 (1991) pp. 726–36, hereby incorporated by reference as if fully set forth herein.

It has also been shown that a network carrying requests having a load between zero and B, is multi-rate strictly nonblocking if the number of center interconnection units is at least $$\lim_{\epsilon \downarrow 0} 2\lfloor (n-B)/(1-B+\epsilon) \rfloor + 1.$$

This will be denoted as $m^0$ for future reference.

Niestegge, "Nonblocking multirate switching networks," Traffic Eng. for ISDN Desig. and Plan., M. Bonatti and M. Decina (Eds.), Elsevier, 1988, hereby incorporated by reference as if fully set forth herein, demonstrated that in general, a network carrying two loads b and B is also strictly nonblocking for more than two rates if b is an integer multiple of all of the rates and 1, and m is at least $$2\lfloor (n-B)/(1-B+b) \rfloor +1.$$

It has also been shown that a single rate network where the reciprocal of the load is an integer, is strictly nonblocking with $2n-1$ center interconnection units.

Note that as B approaches one and b approaches zero, the number of center interconnection units required is unbounded in all of the above formulas. Thus as the range of loads increases, the number of center interconnection units increases, resulting in higher cost and more complex switching networks. In response to this problem, it has been recognized that nonblocking can be achieved even without a strictly nonblocking architecture. Rather, by using an appropriate request routing algorithm, WSNB may help to limit the number of center interconnection units.

For example, consider a network carrying requests whose loads are either 1.0 or 0.25, and where each input switch has four inlets, i.e., n=4. From the foregoing formulas, strictly nonblocking network would require at least twenty five interconnection units. However, if all of the requests with a load of 1.0 are routed through one group of center interconnection units and all requests with a 0.25 load are routed through another group, the network problem could be analyzed as two single-rate networks, each being nonblocking with only seven center interconnection units, as shown by the formula $2n-1$. Hence m is reduced from twenty five to fourteen.

The prior art has achieved a WSNB network with 8n center interconnection units where n is the number of inlets per input stage switch, and a link load capacity of $\beta=1$. Notwithstanding the above example and despite the efficiency that can be realized with WSNB, assuming the proper routing algorithm, there has been very little further development of multirate WSNB in the prior art, to reduce this number further.

SUMMARY OF THE INVENTION

Accordingly, it is an objective of the present invention to provide a method for routing requests through a switching network such that the network has the property of WSNB with a reduced number of center interconnection units.

It is also an objective of the present invention to provide a switching network having the property of WSNB with a reduced number of center interconnection units.

In furtherance of these objectives a new routing algorithm classifies requests into a large group, comprising loads greater than 1/(P+1), and a small group comprising all other requests, where P is $\lfloor 1/B \rfloor$, and B is the upper load bound of any given request. For the general multi-rate case, where B is less than $31/32-\beta/4$, $2\beta n(p+1)(Bp+B-1)/p^2$ center interconnection units are restricted for carrying large requests only. For all other B, $2f(\beta)+1$ center interconnection units are restricted, where $\beta$ is the ratio of load capacity of external links to the input and output stages, and the load capacity of the internal links connecting the center stage to the input and output stages and $f(\beta)=n\lceil \beta(p+1)-1\rceil/p$. Using this routing algorithm, general multirate WSNB is guaranteed with substantially the lesser of $2f(\beta)+1 + 3.75\beta n$ or $2\beta n(p+1)(Bp+B+p-1)/p^2$ interconnection units where n is the number of inlets per input stage switch. For $\beta=1$, where the network is a three-rate network the center stage can be further reduced to substantially between 2n and 5n center interconnection units. The center stage can be even further reduced to substantially between 2n and 3n center interconnection units for a two-rate network.

DETAILED DESCRIPTION OF THE INVENTION

To facilitate the following discussion, the following terminology is introduced. A request (u,v,w) will also be referred to as a (U,V,w) request if u is in the input switch U, and v is in the output switch V. The U-load of a center switch s is the sum of loads of all requests from U to V carried by s. Similarly, the V-load of a center interconnection unit s is the sum of loads of all requests from V to U carried by s. The U,V-load is the sum of the U-load and the V-load.

As previously described, it has been shown that a single-rate strictly nonblocking network requires only 2n−1 center interconnection units, if 1 is an integer multiple of the rate, However, as shown below, 2n−1 center interconnection units can also provide the strictly nonblocking function to a network carrying a range of loads, if the upper load bound B is not greater than 1/p, where p is a positive integer, and the lower load bound b is greater than 1/(p+1).

At most $f(\beta)$, defined as $n\lceil \beta(p+1)-1\rceil/p$, center interconnection units can carry p requests from U. Similarly, at most $f(\beta)$ center switches can carry p requests to V. Thus to carry a new (U,V,W) request, the center stage must comprise $2f(\beta)+1$ interconnection units, which is the same as 2n−1 for $\beta=1$. Taking this conclusion one step further, if all of the loads can be grouped into k rates such that all rates in class I have a value between $1/p_i$ and $1/(p_i+1)$, then the network is WSNB if there are $$2\sum_{i=1}^{k} f_i(\beta) + k$$

interconnection units, where $f_2(\beta)$ is obtained from $f(\beta)$ by replacing p with $p_i$. In other words, $2f_i(\beta)+1$ center interconnection units for each rate of requests.

At this point, it is established that a network with $$2\sum_{i=1}^{k} f_i(\beta) + k$$

center interconnection units is k-rate WSNB. However, this result is still impractical where a network has an unbounded number of rates.

To treat the general multirate case, it is useful to define p as equal to $\lfloor 1/B \rfloor$, in other words, the weakly uniform capacity model where $\beta$ has a normalized value of one. For easier presentation, the integrality of m, i.e., that m should be an integer, is ignored and 2βn is used as the maximum U,V-load before a request (U,V,w) is to be routed, instead of the more accurate 2β(n−w).

Figure 1:
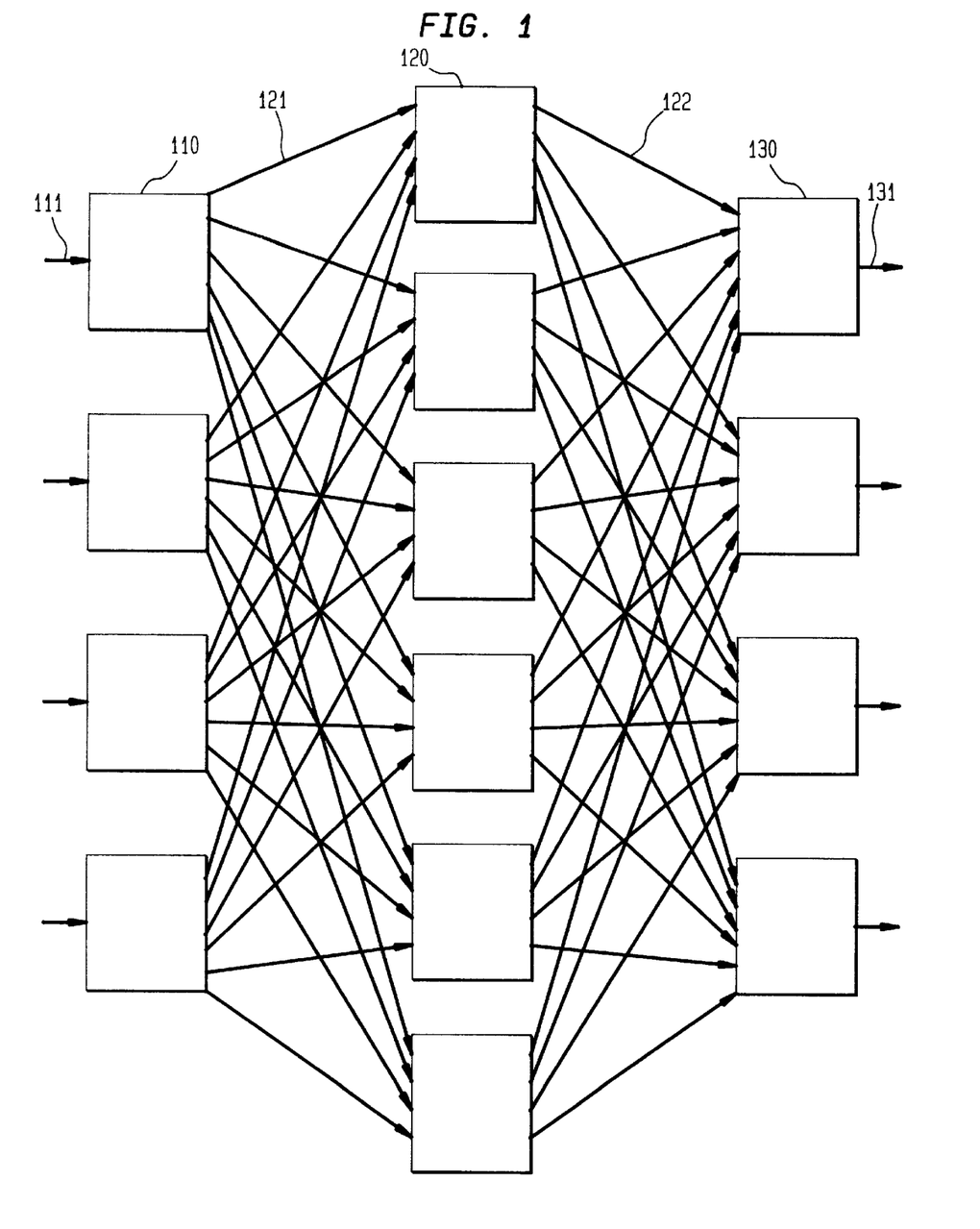
FIG. 1 shows a general multirate WSNB network according to the present invention where each input switch has one inlet and the center stage comprises six interconnection switches.

Referring to FIG. 1, a multirate WSNB network is shown according to the present invention, in which a request input on inlet 111 to input switch 110 is routed to one of center interconnection units 120 through first internal link 121. The request is then routed to output switch 130 through second internal link 122 and output through outlet 131. The number of center interconnection units 120 is substantially the lesser of $2f(\beta)+1+3.75\beta n$ or $(2\beta(p+1)(Bp+B+p-1)n)/p^2$, rounded to the nearest whole integer. As used herein, the word "substantially" is meant to account for physical and economical constraints. Although the number of center interconnection units identified herein is all that is necessary to provide WSNB from a mathematical vantage point, a practical network may deviate somewhat from the exact number. For example, mathematically the precise number of required center interconnection units may not be a whole number. Yet, the network must comprise an integer number of center interconnection units. Such a network would still fall within the scope of the present invention. Likewise, while the precise number of center interconnection units according to the present invention will guarantee WSNB, for economic reasons one may decide to tolerate a certain percentage of blocking in order to save the cost of a certain number of center interconnection units. This too falls within the scope of the present invention. In general, while the WSNB networks of the present invention are described herein with a precise number of center interconnection units, it is clear that one may add a few or subtract a few units from the network, while relying on the principles taught herein. Accordingly, the word "substantial" is used to encompass this range of center interconnection units.

In FIG. 1, center interconnection units 120 are depicted as single interconnection switches. The center interconnection units 120 of the multirate WSNB network of the present invention can just as easily be multi stage networks, in which case each the center stage would comprise substantially the lesser of $2f(\beta)+1+3.75\beta n$ or $(2\beta(p+1)(Bp+B+p-1)n)/p^2$ multi stage networks, each of the center multi stage networks having substantially the lesser of $2f(\beta)+1+3.75\beta n$ and $(2\beta(p+1)(Bp+B+p-1)n)/p^2$ center interconnection units as well.

The network of FIG. 1 is multirate WSNB under a routing algorithm P(x,y) where x center interconnection units are reserved for large requests, and y is the number of all other requests that are classified as small, that are allowed to be routed through the x restricted center interconnection units. Where y is zero, the number of reserved center interconnection units is $$x = \frac{2\beta(p+1)(Bp+B-1)n}{p^2} \quad \text{for } B < 31/32 - \beta/4$$

$$\phantom{x =\ } 2f(\beta)+1 \quad \text{for } B \geq 31/32 - \beta/4$$

and the total number of center stage interconnection units is substantially the lesser of $2f(\beta) + 1 + 3.75\beta n$ or $(2\beta(p+1)(Bp+B+p-1)n)/p^2$, denoted as $m^*$.

The mathematical proof that this routing algorithm provides the nonblocking function with at least the stated number of center interconnection units, is as follows. Considering the case where B is less than $31/32-\beta/4$, a large request (U,V,w) will only be blocked if each inlet n has a corresponding n restricted center interconnection units carrying p requests either from U, or to V, resulting in a U-load or a V-load exceeding $p/(p+1)$. Furthermore, each of the $2\beta(p+1)n/p$ nonrestricted center interconnection units must carry a load exceeding $(1-w) \geq (1-B)$. Therefore the total U-load or V-load carried exceeds $$\frac{2\beta(p+1)(Bp+B-1)n}{p^2}\left(\frac{p}{p+1}\right) + \frac{2\beta(p+1)n}{p}(1-B) = 2\beta n$$

contradicting the fact that both the U-load and the V-load are upper bounded by $\beta n$ and the combined U,V-load upper bounded by $2\beta n$. Thus all large requests can be routed through the restricted center interconnection units.

For a small request (U,V,w) to be blocked, each of the nonrestricted center interconnection units must carry a U,V-load exceeding $(1-w) \geq p/(p+1)$. Thus the total U,V-load exceeds $$\frac{2\beta(p+1)n}{p}\left(\frac{p}{p+1}\right) = 2\beta n,$$

which for the above stated reason is not possible. Thus substantially no request, large or small, can be blocked under the routing algorithm P(x,O).

Considering the case where B is at least $31/32-\beta/4$, p=1 and w is a large request if $w > 1/(p+1) = \frac{1}{2}$, $2f(\beta)+1$ center interconnection units can carry all large requests. As small requests are upper bounded by ½, from the prior solution, $3.75\beta n$ additional center interconnection units suffice to carry all small requests.

The following chart is a comparison between $m^*$ and $m°$ for $\beta=1$, with $m°$ approximated as $2n/(1-B)$, for various values of B.

| B     | .1    | .2    | .3    | .4   | .5   | .6   | .7   | .8   | .9   | 1    |
|-------|-------|-------|-------|------|------|------|------|------|------|------|
| x     | .022  | .096  | .17   | .3   | .75  | .8   | 1.6  | 2    | 2    | 2    |
| m*/n  | 2.222 | 2.496 | 2.84  | 3.3  | 3.75 | 4.85 | 5.6  | 5.75 | 5.75 | 5.75 |
| m°/n  | 2.2   | 2.5   | 2.857 | 3.3  | 4    | 5    | 6.6  | 10   | 20   | ∞    |

Thus $m^*$ is always less than $m°$ and the difference between them increases with B and is unbounded.

Figure 2:
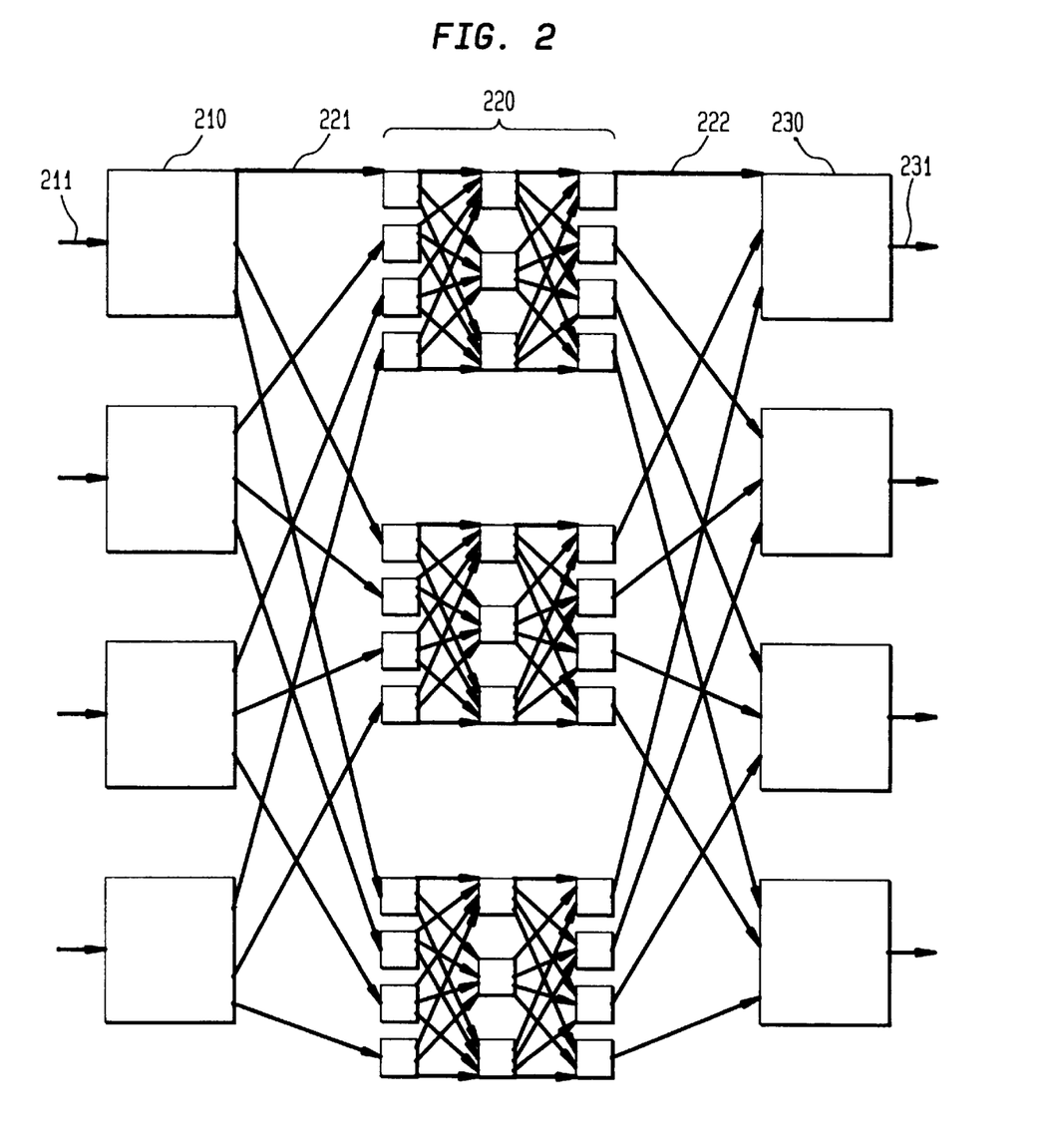
FIG. 2 shows a two-rate WSNB network according to the present invention where each input switch has one inlet and the center stage comprises three MINs.

For the remainder of this description $\beta$ is assumed to have a value of 1. As stated above, a k-rate WSNB switching network has been shown to require $k(2n-1)$ center interconnection units. Referring to FIG. 2, a two-rate WSNB network is shown according to the present invention in which a request input on inlet 211 to input switch 210 is routed to one of center interconnection units 220 through first internal link 221. The request is then routed to output switch 230 through second internal link 222 and output through outlet 231. The number of center interconnection units 220 required to provide the nonblocking function under an appropriate routing algorithm, is substantially between 2n and 3n. Each center interconnection unit 220 is depicted in FIG. 2 as comprising a three stage network where the center stage of each of center interconnection units 220 have 3n center interconnection units. As with the multirate case, center interconnection units 220 can also be single interconnection switches.

For the two rate case, (i) where B is less than 0.5 and b is greater than 0.333; and (ii) where b is greater than or equal to 0.5, 2n center interconnection units provide a strictly nonblocking network and therefore no particular routing algorithm is necessary.

Where B is less than or equal to 0.333, 3n center interconnection units provide WSNB using the routing algorithm described above for the general multirate case.

Two additional two rate cases remain to be discussed. The first case is where B is greater than 0.333 but less than 0.5 and b is less than 0.333. The second case is where B is greater than 0.5 and b is less than 0.5.

In the first of these two cases the network is WSNB with 3n center interconnection units under the routing algorithm $P(x,q_2)$. Here, as in the multirate case, x is the number of restricted center interconnection units for large load requests and $q_2$ is the number of small requests allowed to be routed through the x restricted center interconnection units. The value for x depends on the variable $\delta$ equal to $q_0+q_2-2q_1$ and variables $q_1$ and $q_2$, $q_0$, $q_1$, and $q_2$ are defined by the following three equations $$q_0 b \leq 1 < (q_0+1)b$$

$$B+q_1 b \leq 1 < B+(q_1+1)b$$

$$2B+q_2 b \leq 1 < 2B+(q_2+1)b$$

Where $\delta$ equals 1, it can be shown that $$x = \frac{8q_1^2 - 12q_1q_2 + 4q_2^2 - 2q_2 - 2}{8q_1^2 - 14q_1q_2 + 4q_2^2 + 6q_1 - 6q_2 + 1}$$

and $q_2$ can be solved for the specific values of B and b. Where $\delta$ equals 0 and $q_1$ is greater than $2 q_2+1$, it can be shown that $$x = \frac{4q_1^2 - 6q_1q_2 + 2q_2^2 - 4q_1 + 2q_2}{4q_1^2 - 7q_1q_2 + 4q_2^2 - q_2}.$$

where $\delta$ equals 0 and $q_1$ equals $2q_2$, it can be shown that $$x = \frac{4q_1^2 - 6q_1q_2 + 2q_2^2}{4q_1^2 - 7q_1q_2 + 2q_2^2 + 2q_1 - 2q_2}.$$

Finally, where $\delta$ equals $-1$, $$x = \frac{4q_0q_1^2 - 6q_0q_1q_2 + 2q_0q_2^2 - 4q_0q_1 + 2q_0q_2 - 2q_1^2 - 2q_1}{4q_0q_1^2 - 7q_0q_1q_2 + 2q_0q_2^2 - q_0q_2 - q_1q_2 - q_2}.$$

The second case, namely where B is greater than 0.5 and b is less than 0.5, WSNB is guaranteed with m center interconnection units under the routing algorithm $P(x, q_1)$, where $$m > m^* \equiv \begin{cases} 2 + \dfrac{2(q_0 - q_1)(q_0 - q_1 - 1)}{q_0^2 - q_0q_1 - q_1^2 - q_1} & \text{for } q_0 \leq 2q_1 \\ 2 + \dfrac{2q_1}{q_1 + 1} & \text{for } q_0 \geq +2q_1 + 1 \text{ and} \end{cases}$$

Figure 3:
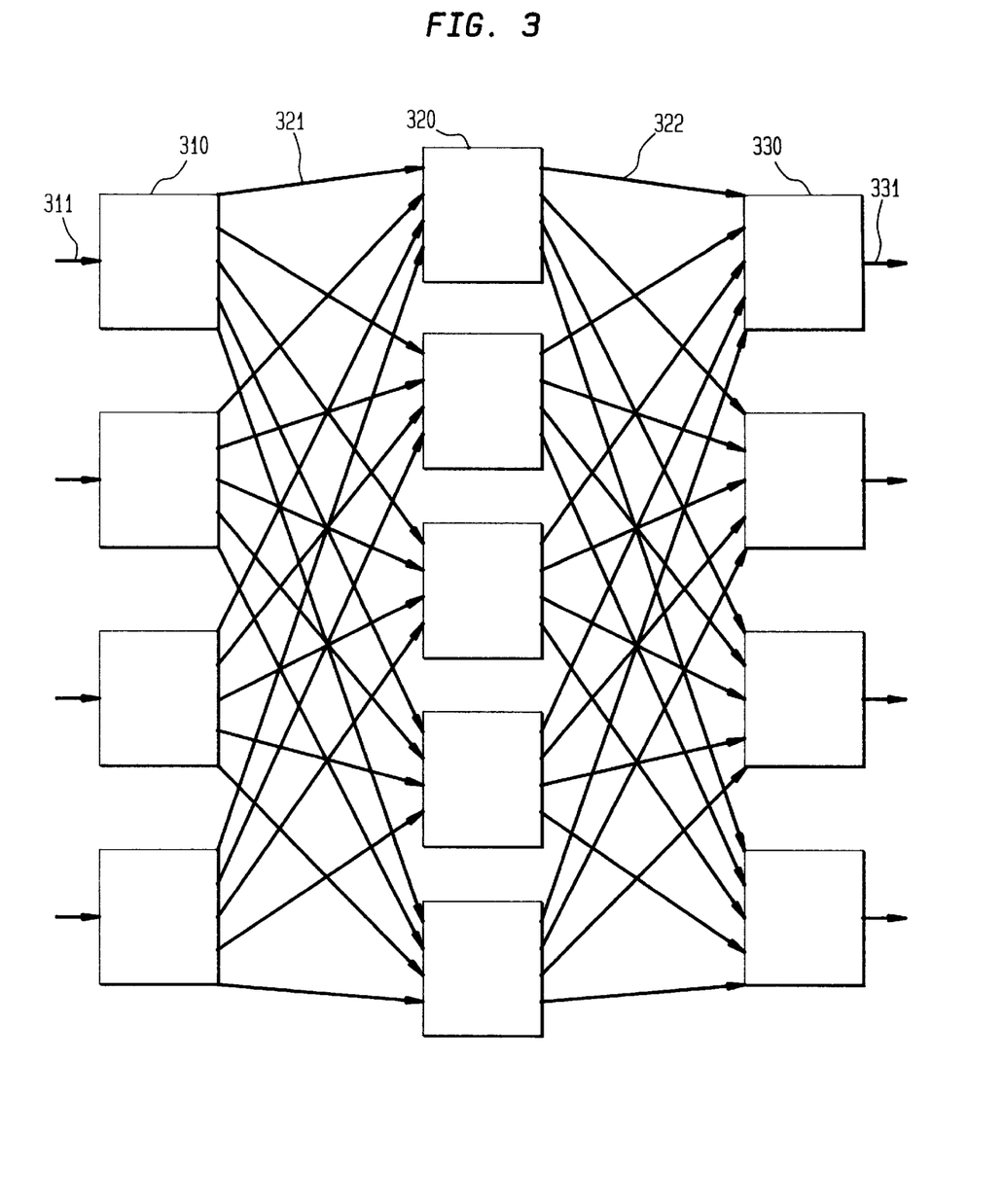
FIG. 3 shows a three-rate WSNB network according to the present invention where each input switch has one inlet and the center stage comprises five interconnection switches.

Referring to FIG. 3, a three rate WSNB network according to the present invention is shown in which a request input on inlet 311 to input switch 310 is routed to one of center interconnection units 320 through first internal link 321. The request is then routed to output switch 330 through second internal link 322 and output through outlet 331. For the three rate WSNB network, between substantially 2n and 5n center interconnection units 320, depending on the load size to be carried, are sufficient for the nonblocking function, under an appropriate routing algorithm. This can be readily seen as follows. First if the lower load bound b is greater than 0.5, in other words all requests have a normalized load greater than 0.5, then as shown above, 2n center interconnection units suffice for all requests and the network is strictly nonblocking.

If the lower load bound can be 0.5 or less, yet, the middle load w is greater than 0.5, then again as shown above 2n center interconnection units suffice —strictly nonblocking— for all middle load and upper load bound requests, and another 2n center interconnection units suffice —strictly nonblocking— for all lower load bound requests.

If the middle load is 0.5 or less, and the upper load bound B is greater than 0.5 then 2n center interconnection units suffice —strictly nonblocking— for all upper load bound requests and another 3n center interconnection units suffice for all middle and lower bound requests using the two-rate routing algorithm with an upper load bound of 0.5. In the three foregoing cases the network is strictly nonblocking so that no specific routing algorithm is necessary.

The last three-rate case network, however, has upper load bound B less than 0.5. In this case 3.75n center interconnection units suffice for all requests and the network is WSNB using the general multirate algorithm $P(x,0)$ discussed above.

The foregoing merely illustrates the principles of the present invention. Those skilled in the art will be able to devise various modifications, which although not explicitly described or shown herein, embody the principles of the invention and are thus within its spirit and scope.

What is claimed is:

1. A multirate Wide Sense NonBlocking network comprising:
    an input stage, said input stage comprising r input switches and n inlet links for each of said r input switches, each of said n inlet links for receiving one or more requests, each of said requests having an associated load with a value between an upper load bound B and a lower load bound b and each of said n inlet links having an external load capacity;
    an output stage, said output stage comprising r output switches and n outlet links for each of said r output switches, said n outlet links for outputting said received requests and each of said n outlet links having said external load capacity; and
    a center stage for routing said one or more requests from said input stage via a plurality of first internal links from each of said r input switches, to said output stage via a plurality of second internal links for each of said output switches, each of said first and second internal links having an internal load capacity, said center stage comprising substantially the lesser of $2f(\beta)+1+3.75\beta n$ or $2n\beta(p+1)(Bp+B+p-1)/p^2$ center interconnection units where $\beta$ is the ratio of said internal load capacity to said external load capacity and $p=\lfloor 1/B \rfloor$.

2. A network according to claim 1 wherein each of said center stage WSNB nonblocking networks comprises an odd number multiple of three stage WSNB networks.

3. A network according to claim 1 wherein each of said center interconnection units is an r×r interconnection switch.

4. A network according to claim 3 wherein said r×r interconnection switch is an r×r crossbar switch.

5. A network according to claim 1 wherein said substantially the lesser of $2f(\beta)+1+3.75\beta n$ or $2n\beta(1+p)(Bp+B+p-1)/p^2$ center interconnection units comprise a plurality of center interconnection units restricted for routing requests having a load greater than $1/(1+p)$.

6. A network according to claim 5 wherein said plurality of restricted center interconnection units is substantially $2\beta n(p+1)(B+B-1)/p^2$ where B is less than approximately $31/32-\beta/4$ and $2\beta n$ otherwise.

7. A three rate Wide Sense NonBlocking network, comprising:
    an input stage, said input stage comprising r input switches and n inlet links for each of said r input switches, each of said n inlet links for receiving one or more requests, each of said requests having an associated load with a value between an upper load bound B and a lower load bound b and each of said n inlet links having an external load capacity;
    an output stage, said output stage comprising r output switches and n outlet links for each of said r output switches, said n outlet links for outputting said received requests and each of said n outlet links having said external load capacity; and
    a center stage for routing said one or more requests from said input stage via a plurality of first internal links from each of said r input switches, to said output stage via a plurality of second internal links for each of said output switches, each of said
    first and second internal links having an internal load capacity, said center stage comprising substantially between 2n and 5n center interconnection units.

8. A network according to claim 7 wherein each of said center stage interconnection units further comprises an odd number multiple of WSNB networks.

9. A network according to claim 7 wherein said network is WSNB for small rates, medium rates and large rates, and wherein said large rates have a normalized value less than or equal to 0.5 and said center stage comprises substantially 3.75n center interconnection units.

10. A two rate Wide Sense NonBlocking Network, comprising:
    an input stage, said input stage comprising r input switches and n inlet links for each of said r input switches, each of said n inlet links for receiving one or more requests, each of said requests having an associated load with a value between an upper load bound B and a lower load bound b and each of said n inlet links having an external load capacity;

an output stage, said output stage comprising r output switches and n outlet links for each of said r output switches, said n outlet links for outputting said received requests and each of said n outlet links having said external load capacity; and a center stage for routing said one or more requests from said input stage via a plurality of first internal links from each of said r input switches, to said output stage via a plurality of second internal links for each of said output switches, each of said first and second internal links having an internal load capacity, said center stage comprising substantially between 2n and 3n center interconnection units.

11. A network according to claim 10 wherein each of said center stage interconnection units further comprises an odd number multiple of WSNB networks.

12. A method for routing one or more requests having a load between an upper bound B and a lower bound b, between an input stage of switches and an output stage of switches in a multi-rate Wide Sense NonBlocking network, said method comprising the steps of:

receiving said requests at one of r input switches of said input stage, through one of n inlet links at each of said r input switches, each of said n inlet links having an external load capacity;

outputting said requests at one of r output switches of said output stage, through one of n outlet links at each of said r output switches each of said n outlet links having said external load capacity; and routing said requests from said input stage via a plurality of first internal links from each of said input switches, to said output stage via a plurality of second internal links from each of said output switches, said first and second internal links having an internal link load capacity, through one or more of between 8n and substantially the lesser of $2f(\beta)+1+3.75n\beta$ and $2\beta n(1+p)(Bp+B+p-1)/p^2$ center interconnection units where $\beta$ is the ratio of said internal link load capacity to said external link load capacity and $p=\lfloor 1/B \rfloor$, said center interconnection units being connected to each of said r input switches through r first internal links, and connected to each of said r output switches through r second internal links.

13. A method according to claim 12 wherein said routing step further comprises the steps of:

grouping said requests having a load greater than $1/(p+1)$ into a large group, and all other of said requests into a small group;

routing said requests of said large group to substantially $2\beta n(p+1)(B+p-1)/p^2$ restricted units of said center interconnection units if B is less than approximately $31/32-\beta/4$, and to substantially $2f(\beta)+1$ restricted units of said center interconnection units for all other B; and routing said requests of said small group to said center interconnection units other than said restricted units.

14. A method for routing one or more requests having a load between an upper bound B and a lower bound b, between an input stage of switches and an output stage of switches in a three-rate Wide Sense NonBlocking network, said method comprising the steps of:

receiving said requests at one of r input switches of said input stage, through one of n inlet links at each of said r input switches, each of said n inlet links having an external load capacity;

outputting said requests at one of r output switches of said output stage, through one of n outlet links at each of said r output switches each of said n outlet links having said external load capacity; and routing said requests from said input stage via a plurality of first internal links from each of said input switches, to said output stage via a plurality of second internal links from each of said output switches, said first and second internal links having an internal link load capacity, through one or more of substantially between 2n and 5n center interconnection units where $\beta$ is the ratio of said internal link load capacity to said external link load capacity, said center interconnection units being connected to each of said r input switches through r first internal links, and connected to each of said r output switches through r second internal links.

15. A method according to claim 14 wherein said lower bound b is greater than 0.5 and wherein said routing step utilizes one or more of substantially 2n center interconnection units.

16. A method according to claim 14 wherein said three rates comprise a first rate, a second rate and a third rate, said second rate greater than said first rate and said third rate greater than said second rate, and wherein said first rate is not greater than 0.5 and said second rate is greater than 0.5 and wherein said routing step further comprises the steps of:

routing all first rate requests through a first set of 2n center interconnection switches of said substantially between 2n and 5n center interconnection units; and routing all secondary and third rate requests through a second set of 2n center interconnection switches of said substantially between 2n and 5n center interconnection units, said second set and said first set being mutually exclusive.

17. A method according to claim 14 wherein said three rates comprise a first rate, a second rate and a third rate, said second rate greater than said first rate and said third rate greater than said second rate, and wherein said second rate is not greater than 0.5, and said third rate is greater than 0.5 said routing step further comprising the steps of:

routing said third rate requests through a first set of 2n center interconnection units of said substantially between 2n and 5n center interconnection units; and routing said first and second rates as follows:

grouping said requests having a load greater than $1/(p+1)$ into a large group and all other of said requests into a small group;

routing said requests of said large group and $q_2$ requests of said small group to x restricted units of said 3n center interconnection units, wherein the value of x substantially depends on $q_1$, $q_2$ and $\delta$, wherein $\delta$ is equal to $q_0+q_2-2q_1$ and $q_1$, $q_2$ and $q_0$ are defined by the following inequalities:

$q_0 b \leq 1 < (q_0+1)b$ $B+q_1 b \leq 1 < B+(q_1+1)b$ $2B+q_2 b \leq 1 < 2B+(q_2+1)b$ such that $$x = \frac{8q_1^2 - 12q_1q_2 + 4q_2^2 - 2q_2 - 2}{8q_1^2 - 14q_1q_2 + 4q_2^2 + 6q_1 - 6q_2 + 1},$$

where δ equals 1;

$$x = \frac{4q_1^2 - 6q_1q_2 + 2q_2^2 - 4q_1 + 2q_2}{4q_1^2 - 7q_1q_2 + 4q_2^2 - q_2},$$

where δ equals 0 and $q_1$ is greater than $2q_2+1$;

$$x = \frac{4q_1^2 - 6q_1q_2 + 2q_2^2}{4q_1^2 - 7q_1q_2 + 2q_2^2 + 2q_1 - 2q_2},$$

where δ=0 and $q_1$, equals $2q_2$; and $$x = \frac{4q_0q_1^2 - 6q_0q_1q_2 + 2q_0q_2^2 - 4q_0q_1 + 2q_0q_2 - 2q_1^2 - 2q_1}{4q_0q_1^2 - 7q_0q_1q_2 + 2q_0q_2^2 - q_0q_2 - q_1q_2 - q_2}$$

where δ equals -1; and
routing said requests of said small group other than said $q_2$ requests to said center interconnection units other than said restricted units.

18. A method according to claim 14 wherein said three rates comprise a first rate, a second rate and a third rate, said second rate greater than said first rate and said third rate greater than said second rate and wherein said third rate is less than 0.5, and wherein said substantially between 2n and 3n center interconnection units comprise 3.75n center interconnection units, said routing step further comprising the steps of:
grouping said requests having a load greater than $1/(p+1)$ into a large group, and all other of said requests into a small group;
routing said requests of said large group to substantially $2\beta n(p+1)(B+p-1)/p^2$ restricted units of said center interconnection units if B is less than approximately $31/32-\beta/4$, and to substantially $2f(\beta)+1$ restricted units of said center interconnection units for all other B; and
routing said requests of said small group to said center interconnection units other than said restricted units.

19. A method for routing one or more requests having a load between an upper bound B and a lower bound b, between an input stage of switches and an output stage of switches in a two-rate Wide Sense NonBlocking network, said method comprising the steps of:
receiving said requests at one of r input switches of said input stage, through one of n inlet links at each of said r input switches, each of said n inlet links having an external load capacity;
outputting said requests at one of r output switches of said output stage, through one of n outlet links at each of said r output switches each of said n outlet links having said external load capacity; and
routing said requests from said input stage via a plurality of first internal links from each of said input switches, to said output stage via a plurality of second internal links from each of said output switches, said first and second internal links having an internal link load capacity, through one or more of substantially between 2n and 3n center interconnection units, said center interconnection units being connected to each of said r input switches through r first internal links, and connected to each of said r output switches through r second internal links.

20. A method according to claim 19 wherein said upper bound B is less than 0.5 and said lower bound b is greater than 0.333, said substantially between 2n and 3n center interconnection units comprising substantially 2n center interconnection units.

21. A method according to claim 19 wherein said lower bound b is not less than 0.5, said substantially between 2n and 3n center interconnection units comprising substantially 2n center interconnection units.

22. A method according to claim 19 wherein said upper bound B is not greater than 0.333 and wherein said substantially between 2n and 3n center interconnection units comprising substantially 3n center interconnection units, said routing step further comprising the steps of:
grouping said requests having a load greater than $1/(p+1)$ into a large group, and all other of said requests into a small group;
routing said requests of said large group to substantially $2\beta n(p+1)(B+p-1)/p^2$ restricted units of said center interconnection units if B is less than approximately $31/32-\beta/4$, and to substantially $2f(\beta)+1$ restricted units of said center interconnection units for all other B; and
routing said requests of said small group to said center interconnection units other than said restricted units.

23. A method according to claim 19 wherein said upper bound B is greater than 0.333 and less than 0.5 and said lower bound b is less than 0.333, said substantially between 2n and 3n center interconnection units comprising substantially 3n center interconnection units, said routing step further comprising the steps of:
grouping said requests having a load greater than $1/(p+1)$ into a large group and all other of said requests into a small group;
routing said requests of said large group and $q_2$ requests of said small group x restricted units of said 3n center interconnection units, wherein the value of x substantially depends on $q_1$, $q_2$ and δ wherein δ is equal to $q_0+q_2-2q_1$ and $q_1$, $q_2$ and $q_0$ are defined by the following inequalities:

$$q_0 b \leq 1 < (q_0+1)b$$

$$B + q_1 b \leq 1 < B + (q_1+1)b$$

$$2B + q_2 b \leq 1 < 2B + (q_2+1)b$$

such that $$x = \frac{8q_1^2 - 12q_1q_2 + 4q_2^2 - 2q_2 - 2}{8q_1^2 - 14q_1q_2 + 4q_2^2 + 6q_1 - 6q_2 + 1},$$

where δ equals 1;

$$x = \frac{4q_1^2 - 6q_1q_2 + 2q_2^2 - 4q_1 + 2q_2}{4q_1^2 - 7q_1q_2 + 4q_2^2 - q_2},$$

where $\delta$ equals 0 and $q_1$ is greater than $2q_2+1$;

$$x = \frac{4q_1^2 - 6q_1q_2 + 2q_2^2}{4q_1^2 - 7q_1q_2 + 2q_2^2 + 2q_1 - 2q_2},$$

where $\delta=0$ and $q_1$, equals $2q_2$; and $$x = \frac{4q_0q_1^2 - 6q_0q_1q_2 + 2q_0q_2^2 - 4q_0q_1 + 2q_0q_2 - 2q_1^2 - 2q_1}{4q_0q_1^2 - 7q_0q_1q_2 + 2q_0q_2^2 - q_0q_2 - q_1q_2 - q_2}$$

where $\delta$ equals $-1$; and routing said requests of said small group other than said $q_2$ requests to said center interconnection units other than said restricted units.

24. A method according to claim 19 wherein said upper bound B is greater than 0.5 and said lower bound b is less than 0.5, said substantially between 2n and 3n center interconnection units comprising more than $$2 + \frac{2(q_0 - q_1)(q_0 - q_1 - 1)}{q_0^2 - q_0q_1 - q_1^2 - q_1}$$

for $q_0 \leq 2q_1$ and $$2 + \frac{2q_1}{q_1 + 1}$$

for $q_0 \geq +2q_1+1$, said routing step further comprising the steps of:

grouping said requests having a load greater than $1(p+1)$ into a large group and all other of said requests into a small group;

routing said requests of said large group and $q_1$ requests of said small group x restricted units of said 3n center interconnection units, wherein the value of x substantially depends on $q_1$, $q_2$ and $\delta$ wherein $\delta$ is equal to $q_0+q_2-2q_1$, and $q_1$, $q_2$ and $q_0$ are defined by the following inequalities:

$q_0 b \leq 1 < (q_0+1)b$ $B+q_1 b \leq 1 < B+(q_1+1)b$ $2B+q_2 b \leq 1 < 2B+(q_2+1)b$ such that $$x = \frac{8q_1^2 - 12q_1q_2 + 4q_2^2 - 2q_2 - 2}{8q_1^2 - 14q_1q_2 + 4q_2^2 + 6q_1 - 6q_2 + 1},$$

where $\delta$ equals 1;

$$x = \frac{4q_1^2 - 6q_1q_2 + 2q_2^2 - 4q_1 + 2q_2}{4q_1^2 - 7q_1q_2 + 4q_2^2 - q_2},$$

where $\delta$ equals 0 and $q_1$ is greater than $2q_2+1$;

$$x = \frac{4q_1^2 - 6q_1q_2 + 2q_2^2}{4q_1^2 - 7q_1q_2 + 2q_2^2 + 2q_1 - 2q_2},$$

where $\delta=0$ and $q_1$, equals $2q_2$; and $$x = \frac{4q_0q_1^2 - 6q_0q_1q_2 + 2q_0q_2^2 - 4q_0q_1 + 2q_0q_2 - 2q_1^2 - 2q_1}{4q_0q_1^2 - 7q_0q_1q_2 + 2q_0q_2^2 - q_0q_2 - q_1q_2 - q_2},$$

where $\delta$ equals $-1$; and routing said requests of said small group other than said $q_1$ requests to said center interconnection units other than said restricted units.

* * * * *